(12) United States Patent  
    Dolgov et al.

(10) Patent No.: US 9,090,259 B2  
(45) Date of Patent: Jul. 28, 2015

(54) CONTROLLING VEHICLE LATERAL LANE POSITIONING

(71) Applicant: Google Inc., Mountain View, CA (US)

(72) Inventors: Dmitri Dolgov, Mountain View, CA (US); Christopher Urmson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/302,990

(22) Filed: Jun. 12, 2014

(65) Prior Publication Data

US 2014/0297094 A1    Oct. 2, 2014

Related U.S. Application Data

(63) Continuation of application No. 13/903,693, filed on May 28, 2013, now Pat. No. 8,781,670, which is a continuation of application No. 13/664,325, filed on Oct. 30, 2012, now Pat. No. 8,473,144.

(51) Int. Cl.
    *B60W 30/00*        (2006.01)
    *G05D 3/00*         (2006.01)
    (Continued)

(52) U.S. Cl.
    CPC .............. *B60W 30/12* (2013.01); *B60W 10/20* (2013.01); *B60W 30/095* (2013.01); *B60W 30/18163* (2013.01); *B62D 15/026* (2013.01); *G05D 1/0212* (2013.01); *B60W 2550/302* (2013.01); *B60W 2550/306* (2013.01); *B60W 2750/308* (2013.01)

(58) Field of Classification Search
    CPC .................... B60W 30/181163; B60W 30/12; B60W 30/095; B60W 10/20; B60W 2550/306; B60W 2550/302; B60W 2750/308; B62D 15/026; G05D 1/0212
    See application file for complete search history.

(56) References Cited

U.S. PATENT DOCUMENTS 5,208,750 A    5/1993    Kurami et al.
6,032,097 A    2/2000    Iihoshi et al.
(Continued)

FOREIGN PATENT DOCUMENTS

CN    101466583 A    8/2012
CN    102649430 A    5/2013

OTHER PUBLICATIONS

CN Search Report from co-pending China Patent Application No. 201310156473.6 dated Nov. 4, 2014.

*Primary Examiner* — Michael J Zanelli  
(74) *Attorney, Agent, or Firm* — McDonnell Boehnen Hulbert & Berghoff LLP

(57) ABSTRACT

Methods and systems for controlling vehicle lateral lane positioning are described. A computing device may be configured to identify an object in a vicinity of a vehicle on a road. The computing device may be configured to estimate, based on characteristics of the vehicle and respective characteristics of the object, an interval of time during which the vehicle will be laterally adjacent to the object. Based on the characteristics of the vehicle, the computing device may be configured to estimate longitudinal positions of the vehicle on the road during the interval of time. Based on the respective characteristics of the object, the computing device may be configured to determine a lateral distance for the vehicle to maintain between the vehicle and the object during the interval of time at the longitudinal positions of the vehicle, and provide instructions to control the vehicle based on the lateral distance.

20 Claims, 7 Drawing Sheets

(51) Int. Cl.
  *B62D 6/00*     (2006.01)
  *B60W 30/12*    (2006.01)
  *B62D 15/02*    (2006.01)
  *B60W 30/095*   (2012.01)
  *B60W 10/20*    (2006.01)
  *B60W 30/18*    (2012.01)
  *G05D 1/02*     (2006.01)

(56) References Cited

U.S. PATENT DOCUMENTS

| | | | |
|---|---|---|---|
| 6,275,773 B1 | 8/2001 | Lemelson et al. | |
| 6,292,725 B1 | 9/2001 | Kageyama et al. | |
| 6,574,536 B1 | 6/2003 | Kawagoe et al. | |
| 7,765,066 B2 | 7/2010 | Braeuchle et al. | |
| 7,778,753 B2 | 8/2010 | Fujiwara et al. | |
| 8,311,730 B2 | 11/2012 | Neff | |
| 2001/0037165 A1 | 11/2001 | Shirai et al. | |
| 2004/0178945 A1 | 9/2004 | Buchanan | |
| 2007/0211919 A1* | 9/2007 | Nagaoka et al. | 382/104 |
| 2008/0303696 A1 | 12/2008 | Aso et al. | |
| 2009/0157247 A1* | 6/2009 | Sjogren et al. | 701/23 |
| 2010/0104199 A1 | 4/2010 | Zhang et al. | |
| 2010/0228419 A1 | 9/2010 | Lee et al. | |
| 2010/0324797 A1* | 12/2010 | Fritz | 701/96 |
| 2013/0057397 A1 | 3/2013 | Cutler et al. | |
| 2013/0060414 A1 | 3/2013 | Lee et al. | |

* cited by examiner

COMPUTER PROGRAM PRODUCT 500

SIGNAL BEARING MEDIUM 501

PROGRAM INSTRUCTIONS 502

- IDENTIFYING ONE OR MORE OBJECTS ON OR PROXIMATE TO A ROAD ON WHICH A VEHICLE IS TRAVELLING BASED ON A TRAJECTORY

FOR EACH OBJECT OF THE ONE OR MORE OBJECTS:

- ESTIMATING, BASED ON ONE OR MORE CHARACTERISTICS OF THE VEHICLE AND ONE OR MORE RESPECTIVE CHARACTERISTICS OF A RESPECTIVE OBJECT, A RESPECTIVE INTERVAL OF TIME DURING WHICH THE VEHICLE WILL BE LATERALLY ADJACENT TO THE RESPECTIVE OBJECT

- ESTIMATING, BASED ON THE ONE OR MORE CHARACTERISTICS OF THE VEHICLE, ONE OR MORE RESPECTIVE LONGITUDINAL POSITIONS OF THE VEHICLE ON THE ROAD DURING THE RESPECTIVE INTERVAL OF TIME

- DETERMINING, BASED ON THE ONE OR MORE RESPECTIVE CHARACTERISTICS OF THE RESPECTIVE OBJECT, A RESPECTIVE LATERAL DISTANCE FOR THE VEHICLE TO MAINTAIN BETWEEN THE VEHICLE AND THE RESPECTIVE OBJECT DURING THE RESPECTIVE INTERVAL OF TIME AT THE ONE OR MORE RESPECTIVE LONGITUDINAL POSITIONS OF THE VEHICLE

- DETERMINING A MODIFIED TRAJECTORY OF THE VEHICLE BASED ON DETERMINED RESPECTIVE LATERAL DISTANCES RELATING TO THE VEHICLE AND THE ONE OR MORE OBJECTS

- PROVIDING INSTRUCTIONS TO CONTROL THE VEHICLE BASED ON THE MODIFIED TRAJECTORY

| COMPUTER READABLE MEDIUM 503 | COMPUTER RECORDABLE MEDIUM 504 | COMMUNICATIONS MEDIUM 505 |
|---|---|---|

FIGURE 5

CONTROLLING VEHICLE LATERAL LANE POSITIONING

CROSS REFERENCE TO RELATED APPLICATION

The present application is a continuation of U.S. patent application Ser. No. 13/903,693, filed on May 28, 2013, and entitled "Controlling Vehicle Lateral Lane Positioning," which is a continuation of U.S. patent application Ser. No. 13/664,325 (now U.S. Pat. No. 8,473,144), filed on Oct. 30, 2012, and entitled "Controlling Vehicle Lateral Lane Positioning," all of which are herein incorporated by reference as if fully set forth in this description.

BACKGROUND

Autonomous vehicles use various computing systems to aid in transporting passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

SUMMARY

The present application discloses embodiments that relate to controlling vehicle lateral lane positioning. In one aspect, the present application describes a method. The method may comprise identifying, by a computing device, an object on or proximate to a road on which a vehicle is travelling. The method also may comprise estimating, based on one or more characteristics of the vehicle and one or more respective characteristics of the object, an interval of time during which the vehicle will be laterally adjacent to the object. The method also may comprise, based on the one or more characteristics of the vehicle, estimating one or more longitudinal positions of the vehicle on the road during the interval of time. The method further may comprise determining, based on the one or more respective characteristics of the object, a lateral distance for the vehicle to maintain between the vehicle and the object during the interval of time at the one or more longitudinal positions of the vehicle. The method also may comprise providing, using the computing device, instructions to control the vehicle based on the lateral distance.

In another aspect, the present application describes a non-transitory computer readable medium having stored thereon executable instructions that, upon execution by a computing device, cause the computing device to perform functions. The functions may comprise identifying one or more objects on or proximate to a road on which a vehicle is travelling based on a trajectory. The functions also may comprise, for each object of the one or more objects, estimating, based on one or more characteristics of the vehicle and one or more respective characteristics of a respective object, a respective interval of time during which the vehicle will be laterally adjacent to the respective object; estimating, based on the one or more characteristics of the vehicle, one or more respective longitudinal positions of the vehicle on the road during the respective interval of time; and determining, based on the one or more respective characteristics of the respective object, a respective lateral distance for the vehicle to maintain between the vehicle and the respective object during the respective interval of time at the one or more respective longitudinal positions of the vehicle. The functions further may comprise determining a modified trajectory of the vehicle based on determined respective lateral distances relating to the vehicle and the one or more objects. The functions also may comprise providing instructions to control the vehicle based on the modified trajectory.

In still another aspect, the present application describes a control system. The control system may comprise at least one processor. The control system also may comprise a memory having stored thereon executable instructions that, upon execution by the at least one processor, cause the control system to perform functions comprising identifying one or more objects on or proximate to a road on which a vehicle is travelling based on a trajectory. The functions may also comprise, for each object of the one or more objects, estimating, based on one or more characteristics of the vehicle and one or more respective characteristics of a respective object, a respective interval of time during which the vehicle will be laterally adjacent to the respective object; estimating, based on the one or more characteristics of the vehicle, one or more respective longitudinal positions of the vehicle on the road during the respective interval of time; and determining, based on the one or more respective characteristics of the respective object, a respective lateral distance for the vehicle to maintain between the vehicle and the respective object during the respective interval of time at the one or more respective longitudinal positions of the vehicle. The functions further may comprise determining a modified trajectory of the vehicle based on determined respective lateral distances relating to the vehicle and the one or more objects; and providing instructions to control the vehicle based on the modified trajectory.

The foregoing summary is illustrative only and is not intended to be in any way limiting. In addition to the illustrative aspects, embodiments, and features described above, further aspects, embodiments, and features will become apparent by reference to the figures and the following detailed description

BRIEF DESCRIPTION OF THE FIGURES

FIG. 5 is a schematic illustrating a conceptual partial view of a computer program, in accordance with an example embodiment.

DETAILED DESCRIPTION

Figure 1:
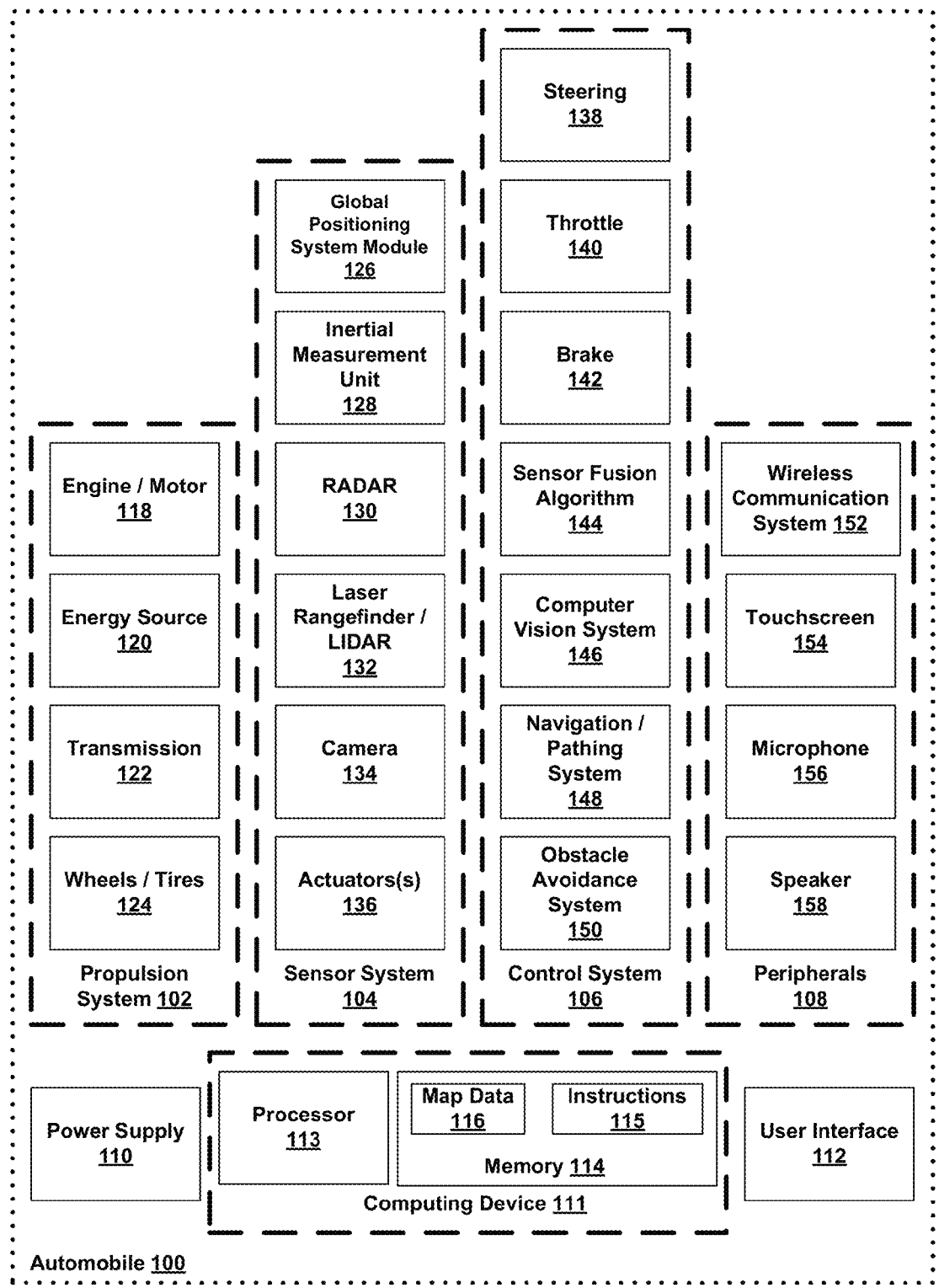
FIG. 1 is a simplified block diagram of an example automobile, in accordance with an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

An autonomous vehicle operating on a road may rely on identifying objects in a vicinity of the vehicle to determine a safe trajectory or path for the vehicle on the road. In some examples, following a geometric center of a lane may not be sufficient for safety; instead, the vehicle may be configured to determine a lateral position in the lane based on a plurality of factors. For example, the vehicle may take into consideration curvature of the road, proximity of static and dynamic obstacles, relative positions and speeds of the obstacles, etc.

In an example, a computing device, configured to control a vehicle following a given trajectory on a road, may be configured to identify a set of objects that may have an effect on a lateral positioning of the vehicle within a lane. The set of objects may include, for example, cars in adjacent lanes both behind and ahead of the vehicle, static objects (e.g., guard rails, curbs, trees, etc.), motorcycles and cyclists ahead and behind the vehicle, etc. Upon identifying the objects, the computing device may be configured to estimate characteristics of each object such as size of each object, position of each object in a respective lane, longitudinal and lateral speeds of each object relative to the vehicle, etc.

The computing device, based on the characteristics of each object and characteristics of the vehicle (e.g., speed of the vehicle), may be configured to determine an interval of time during which the vehicle will be laterally adjacent to a respective object. Further, based on a current speed and an estimated acceleration/deceleration of the vehicle, the computing device may be configured to estimate one or more longitudinal positions (e.g., discretized positions) of the vehicle on the road during the interval of time that the vehicle will be laterally adjacent to the object.

For each object identified, the computing device further may be configured to estimate, based on the characteristics of the respective object, a respective lateral distance for the vehicle to maintain between the vehicle and the respective object during the interval of time at the one or more estimated longitudinal positions. The computing device may be configured to implement heuristics, for example, to mimic human-like behavior to determine the respective lateral distance. For instance, when a large truck or a car moving at a high speed is laterally adjacent to the vehicle, the computing device may be configured to determine a lateral distance that is larger than a given lateral distance determined when a slow-moving car is laterally adjacent to the vehicle. Similarly, a large lateral distance may be determined when passing motorcycles, cyclists, and pedestrians. Also, the computing device may be configured to determine larger lateral distance for dynamic objects than for static objects. The computing device may be configured to take into consideration other factors such as a type of lane the vehicle is currently in (e.g., a high occupancy vehicle lane), road condition, etc., to determine the respective lateral distance.

Further, the computing device may be configured to determine a modified trajectory for the vehicle based on respective lateral distances determined for the objects. To determine the modified trajectory, the computing device may be configured to assign a respective weight to each respective lateral distance determined for a respective object. The respective weight may, for example, be determined based on the characteristics of the respective object. The computing device may be configured to take into account the respective weights to determine the modified trajectory. The computing device may be configured to provide instructions to control the vehicle (e.g., modify speed, steering angle, etc.) to cause the vehicle to follow the modified trajectory and maintain safe lateral distances with the objects in the vicinity of the vehicle.

An example vehicle control system may be implemented in or may take the form of an automobile. Alternatively, a vehicle control system may be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

Further, an example system may take the form of a non-transitory computer-readable medium, which has program instructions stored thereon that are executable by at least one processor to provide the functionality described herein. An example system may also take the form of an automobile or a subsystem of an automobile that includes such a non-transitory computer-readable medium having such program instructions stored thereon.

Referring now to the Figures, FIG. 1 is a simplified block diagram of an example automobile 100, in accordance with an example embodiment. Components coupled to or included in the automobile 100 may include a propulsion system 102, a sensor system 104, a control system 106, peripherals 108, a power supply 110, a computing device 111, and a user interface 112. The computing device 111 may include a processor 113, and a memory 114. The computing device 111 may be a controller, or part of the controller, of the automobile 100. The memory 114 may include instructions 115 executable by the processor 113, and may also store map data 116. Components of the automobile 100 may be configured to work in an interconnected fashion with each other and/or with other components coupled to respective systems. For example, the power supply 110 may provide power to all the components of the automobile 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the automobile 100 may include more, fewer, or different systems, and each system may include more, fewer, or different components. Additionally, the systems and components shown may be combined or divided in any number of ways.

The propulsion system 102 may be configured to provide powered motion for the automobile 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power.

The energy source(s) 120 could additionally or alternatively include any combination of fuel tanks, batteries, capacitors, and/or flywheels. In some examples, the energy source 120 may provide energy for other systems of the automobile 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of automobile 100 could be configured in various formats, including a unicycle, bicycle/motorcycle, tricycle, or car/truck four-wheel format. Other wheel/tire formats are possible as well, such as those including six or more wheels. The wheels/tires 124 of automobile 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the automobile 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that monitor internal systems of the automobile 100 (e.g., an $O_2$ monitor, a fuel gauge, an engine oil temperature, etc.). Other sensors are possible as well.

The GPS module 126 may be any sensor configured to estimate a geographic location of the automobile 100. To this end, the GPS module 126 may include a transceiver configured to estimate a position of the automobile 100 with respect to the Earth, based on satellite-based positioning data. In an example, the computing device 111 may be configured to use the GPS module 126 in combination with the map data 116 to estimate a location of a lane boundary on road on which the automobile 100 may be travelling on. The GPS module 126 may take other forms as well.

The IMU 128 may be any combination of sensors configured to sense position and orientation changes of the automobile 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the automobile 100 is located using light. Generally, LIDAR is an optical remote sensing technology that can measure distance to, or other properties of, a target by illuminating the target with light. As an example, the LIDAR unit 132 may include a laser source and/or laser scanner configured to emit laser pulses and a detector configured to receive reflections of the laser pulses. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, The LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the automobile 100 is located. To this end, the camera may be configured to detect visible light, or may be configured to detect light from other portions of the spectrum, such as infrared or ultraviolet light. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may be configured to use a structured light technique in which the automobile 100 illuminates an object in the environment with a predetermined light pattern, such as a grid or checkerboard pattern and uses the camera 134 to detect a reflection of the predetermined light pattern off the object. Based on distortions in the reflected light pattern, the automobile 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the automobile 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the automobile 100.

The throttle 140 may be any combination of mechanisms configured to control the operating speed and acceleration of the engine/motor 118 and, in turn, the speed and acceleration of the automobile 100.

The brake unit 142 may be any combination of mechanisms configured to decelerate the automobile 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the automobile 100 is located, evaluations of particular situations, and/or evaluations of possible impacts based on particular situations. Other assessments are possible as well The computer vision system 146 may be any system configured to process and analyze images captured by the camera 134 in order to identify objects and/or features in the environment in which the automobile 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate speed of objects, etc.

The navigation and pathing system 148 may be any system configured to determine a driving path for the automobile 100. The navigation and pathing system 148 may additionally be configured to update the driving path dynamically while the automobile 100 is in operation. In some examples, the navigation and pathing system 148 may be configured to incorporate data from the sensor fusion algorithm 144, the GPS module 126, and one or more predetermined maps so as to determine the driving path for the automobile 100.

The obstacle avoidance system 150 may be any system configured to identify, evaluate, and avoid or otherwise negotiate obstacles in the environment in which the automobile 100 is located.

The control system 106 may additionally or alternatively include components other than those shown.

Peripherals 108 may be configured to allow the automobile 100 to interact with external sensors, other automobiles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other automobiles, sensors, or other entities, either directly or via a communication network. To this end, the wireless communication system 152 may include an antenna and a chipset for communicating with the other automobiles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the automobile 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the automobile 100. Similarly, the speakers 158 may be configured to output audio to the user of the automobile 100.

The peripherals 108 may additionally or alternatively include components other than those shown.

The power supply 110 may be configured to provide power to some or all of the components of the automobile 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the automobile 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various automobile functions, including any of the functions or methods described herein.

The components of the automobile 100 could be configured to work in an interconnected fashion with other components within and/or outside their respective systems. To this end, the components and systems of the automobile 100 may be communicatively linked together by a system bus, network, and/or other connection mechanism (not shown).

Further, while each of the components and systems is shown to be integrated in the automobile 100, in some examples, one or more components or systems may be removably mounted on or otherwise connected (mechanically or electrically) to the automobile 100 using wired or wireless connections.

The automobile 100 may include one or more elements in addition to or instead of those shown. For example, the automobile 100 may include one or more additional interfaces and/or power supplies. Other additional components are possible as well. In these examples, the memory 114 may further include instructions executable by the processor 113 to control and/or communicate with the additional components.

Figure 2:
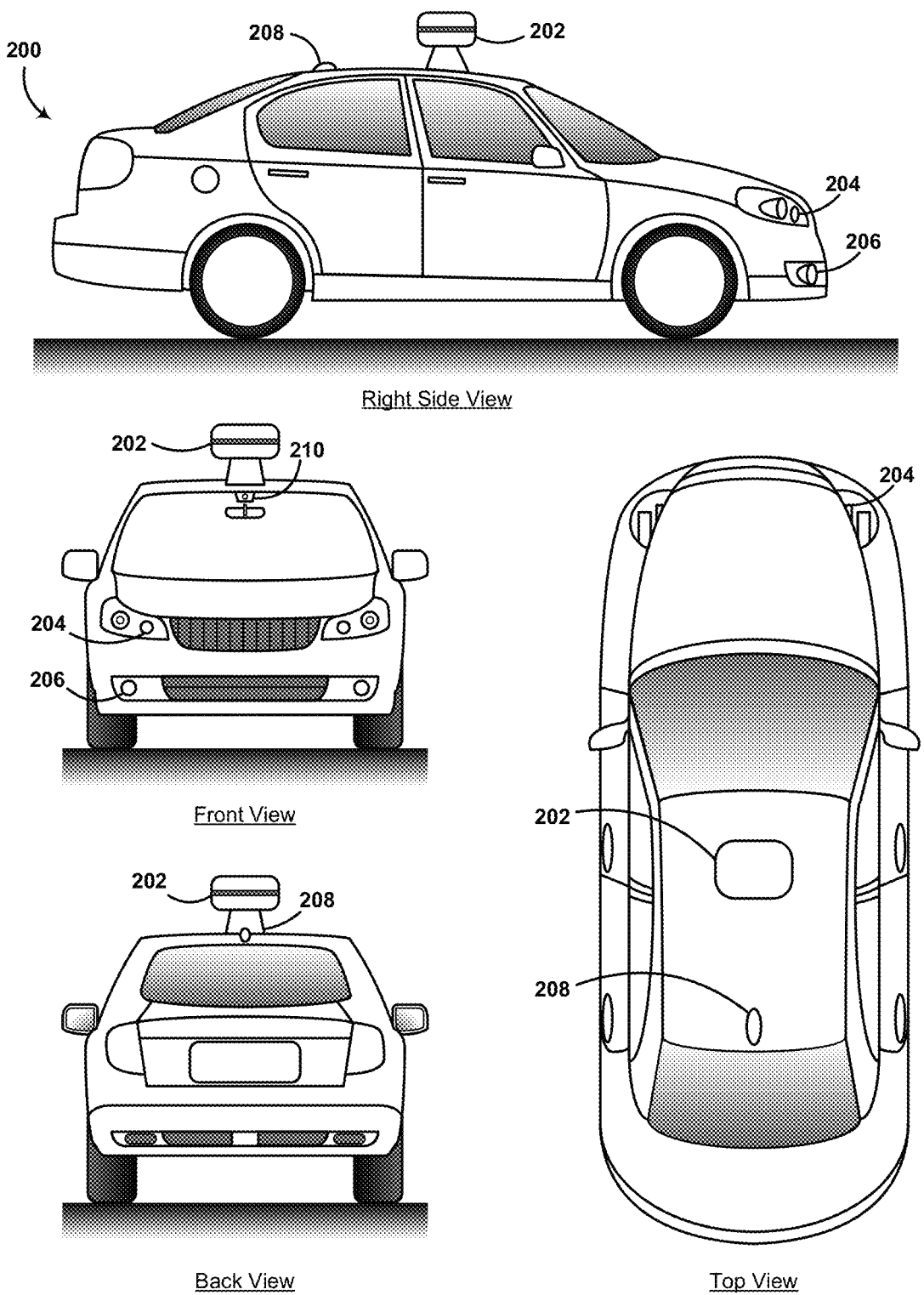
FIG. 2 illustrates an example automobile, in accordance with an example embodiment.

FIG. 2 illustrates an example automobile 200, in accordance with an embodiment. In particular, FIG. 2 shows a Right Side View, Front View, Back View, and Top View of the automobile 200. Although automobile 200 is illustrated in FIG. 2 as a car, other examples are possible. For instance, the automobile 200 could represent a truck, a van, a semi-trailer truck, a motorcycle, a golf cart, an off-road vehicle, or a farm vehicle, among other examples. As shown, the automobile 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the automobile 200, in some examples the sensor unit 202 may be mounted elsewhere on the automobile 200, either inside or outside the automobile 200. Further, while only three sensor units are shown, in some examples more or fewer sensor units may be included in the automobile 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the automobile 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other automobiles, sensors, or other entities, either directly or via a communication network as described above with respect to the wireless communication system 152 in FIG. 1. While the wireless communication system 208 is shown to be positioned on a roof of the automobile 200, in other examples the wireless communication system 208 could be located, fully or in part, elsewhere.

The camera 210 may be any camera (e.g., a still camera, a video camera, etc.) configured to capture images of the environment in which the automobile 200 is located. To this end, the camera 210 may take any of the forms described above with respect to the camera 134 in FIG. 1. While the camera 210 is shown to be mounted inside a front windshield of the automobile 200, in other examples the camera 210 may be mounted elsewhere on the automobile 200, either inside or outside the automobile 200.

The automobile 200 may include one or more other components in addition to or instead of those shown.

A control system of the automobile 200 may be configured to control the automobile 200 in accordance with a control strategy from among multiple possible control strategies. The control system may be configured to receive information from sensors coupled to the automobile 200 (on or off the automobile 200), modify the control strategy (and an associated driving behavior) based on the information, and control the automobile 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
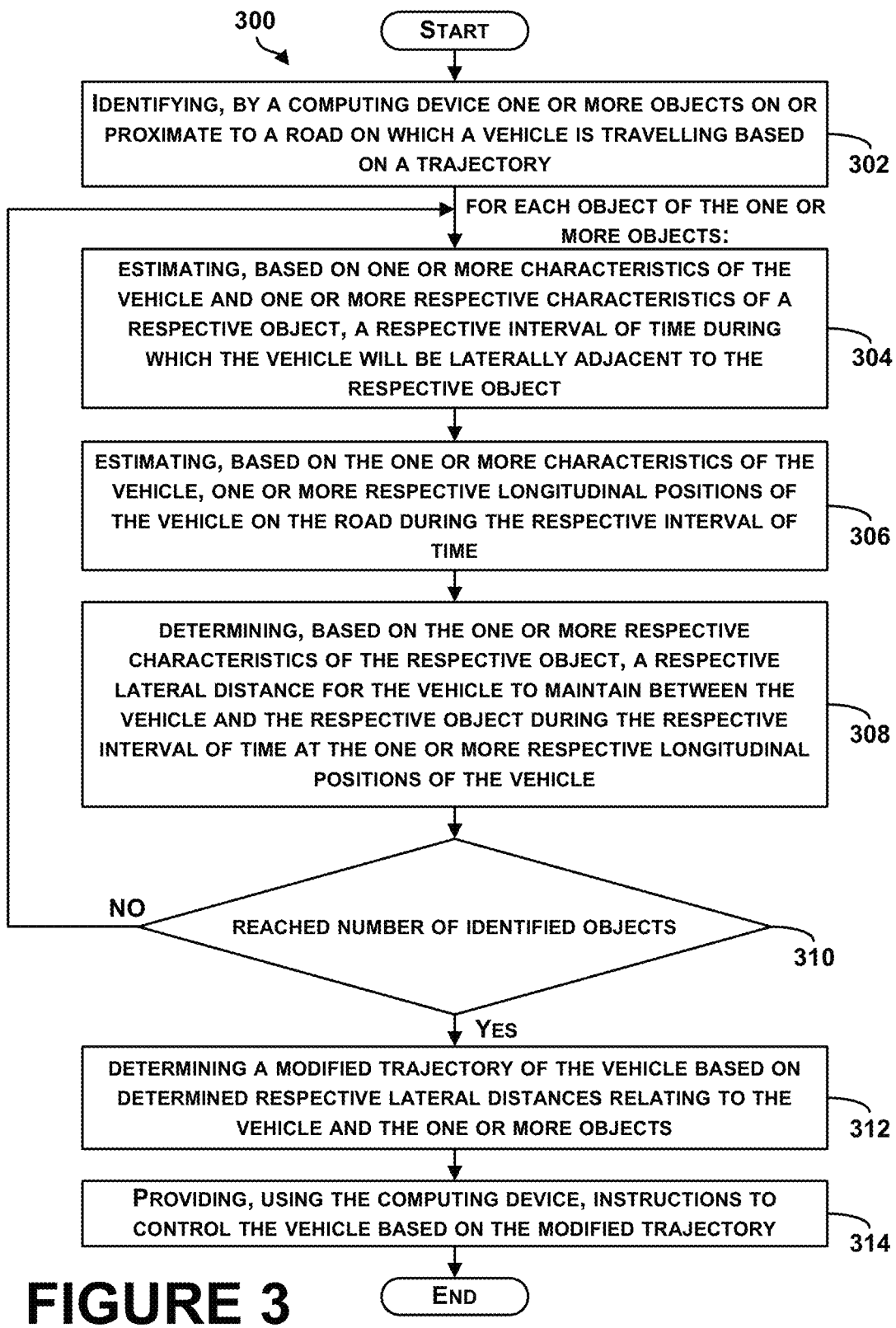
FIG. 3 is a flow chart of a method for controlling vehicle lateral lane positioning, in accordance with an example embodiment.

FIG. 3 is a flow chart of a method 300 for controlling vehicle lateral lane positioning, in accordance with an example embodiment.

The method 300 may include one or more operations, functions, or actions as illustrated by one or more of blocks 302-314. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process.

At block 302, the method 300 includes identifying, by a computing device, one or more objects on or proximate to a road on which a vehicle is travelling based on a trajectory. A controller or a computing device, such as the computing device 111 in FIG. 1, may be onboard the vehicle or may be off-board but in wireless communication with the vehicle, for example. Also, the computing device may be configured to control the vehicle in an autonomous or semi-autonomous operation mode. Further, the computing device may be configured to receive, from sensors and devices coupled to the vehicle, information associated with, for example, condition of systems and subsystems of the vehicle, driving conditions, road conditions, etc.

The computing device may be configured to identify a set of nearby obstacles or objects on the road or proximate to (e.g., in a vicinity of) the road of travel of the vehicle. For example, the computing device may be configured to identify vehicles in adjacent lanes both behind and ahead of the vehicle, static objects next to or ahead of the vehicle (e.g., guard rails on freeways, curbs, trees, parked cars, traffic signs, etc.,), motorcycles and cyclists ahead and behind, nearby pedestrians, both on the road and off the road, and any other object that may influence lateral positioning of the vehicle in a lane on the road.

In addition to identifying the objects, the computing device may be configured to determine respective characteristics of each object of the objects. For example, the computing device may be configured to determine a type of an object or classify the object (e.g., static or dynamic, car or truck, car or motorcycle, traffic sign or a pedestrian, etc.). Also, the computing device may be configured to estimate a size (e.g., width and length) of the object. Further, the computing device may be configured to determine a position of the object in a respective lane on the road, and how close the object may be to lane boundaries. In some examples, the computing device may be configured to determine relative longitudinal speed and lateral speed of the object with respect to the vehicle. These characteristics are examples for illustration, and other characteristics that may have an effect on lateral positioning of the vehicle in the lane of the vehicle can be determined.

To identify the object and characteristics of the objects, the computing device may be configured to use the sensors and devices coupled to the vehicle. For example, a camera, such as the camera 134 in FIG. 1 or the camera 210 in FIG. 2 or any other image-capture device, may be coupled to the vehicle and may be in communication with the computing device. The camera may be configured to capture images or a video of the road and vicinity of the road. The computing device may be configured to receive the images or video and identify, using image processing techniques for example, objects depicted in the image or the video. The computing device may be configured compare portions of the images to templates of objects to identify the objects, for example.

In another example, the computing device may be configured to receive, from a LIDAR device (e.g., the LIDAR unit 132 in FIG. 1) coupled to the vehicle and in communication with the computing device, LIDAR-based information that may include a three-dimensional (3D) point cloud. The 3D point cloud may include points corresponding to light emitted from the LIDAR device and reflected from objects on the road or in the vicinity of the road.

As described with respect to the LIDAR unit 132 in FIG. 1, operation of the LIDAR device may involve an optical remote sensing technology that enables measuring properties of scattered light to find range and/or other information of a distant target. The LIDAR device, for example, may be configured to emit laser pulses as a beam, and scan the beam to generate two dimensional or three dimensional range matrices. In an example, the range matrices may be used to determine distance to an object or surface by measuring time delay between transmission of a pulse and detection of a respective reflected signal.

In examples, the LIDAR device may be configured to scan an environment surrounding the vehicle in three dimensions. In some examples, more than one LIDAR device may be coupled to the vehicle to scan a complete 360° horizon of the vehicle. The LIDAR device may be configured to provide to the computing device a cloud of point data representing obstacles or objects, which have been hit by the laser, on the road and the vicinity of the road. The points may be represented by the LIDAR device in terms of azimuth and elevation angles, in addition to range, which can be converted to (X, Y, Z) point data relative to a local coordinate frame attached to the vehicle. Additionally, the LIDAR device may be configured to provide to the computing device intensity values of the light or laser reflected off the obstacles that may be indicative of a surface type of a given object. Based on such information, the computing device may be configured to identify the objects and characteristics of the objects such as type of the object, size, speed, whether the object is a traffic sign with a retroreflective surface, etc.

In still another example, the computing device may be configured to receive, from a RADAR device (e.g., the RADAR unit 130 in FIG. 1) coupled to the vehicle and in communication with the computing device, RADAR-based information relating to location and characteristics of the objects. The RADAR device may be configured to emit radio waves and receive back the emitted radio waves that bounced off the surface of objects on the road and in the vicinity of the road. The received signals or RADAR-based information may be indicative, for example, of dimensional characteristics of a given object, and may indicate whether the given object is stationary or moving.

In yet still another example, the computing device may be configured to have access to map information that identifies static objects that are permanently placed on the road such as traffic signs, guard rails, etc.

In one example, the computing device may be configured to detect and identify the objects and characteristics of the objects based on information received from multiple sources such as the image-capture device, the LIDAR device, the RADAR device, etc. However, in another example, the computing device may be configured to identify the objects based on information received from a subset of the multiple sources. For example, images captured by the image-capture device may be blurred due to a malfunction of the image-capture device, and in another example, details of the road may be obscured in the images because of fog. In these examples, the computing device may be configured to identify the objects based on information received from the LIDAR and/or RADAR units and may be configured to disregard the information received from the image-capture device.

In another example, the vehicle may be travelling in a portion of the road where some electric noise or jamming signals may cause the LIDAR device and/or RADAR device to operate incorrectly. In this case, the computing device may be configured to identify the objects based on information received from the image-capture device, and may be configured to disregard the information received from the LIDAR and/or RADAR units.

In one example, the computing device may be configured to rank these sources of information based on a condition of the road (e.g., fog, electronic jamming, etc.). The ranking may be indicative of which device(s) to rely on or give more weight to in identifying the objects. As an example, if fog is present in a portion of the road, then the LIDAR and RADAR devices may be ranked higher than the image-based device, and information received from the LIDAR and/or RADAR devices may be given more weight than respective information received from the image-capture device.

Figure 4A:
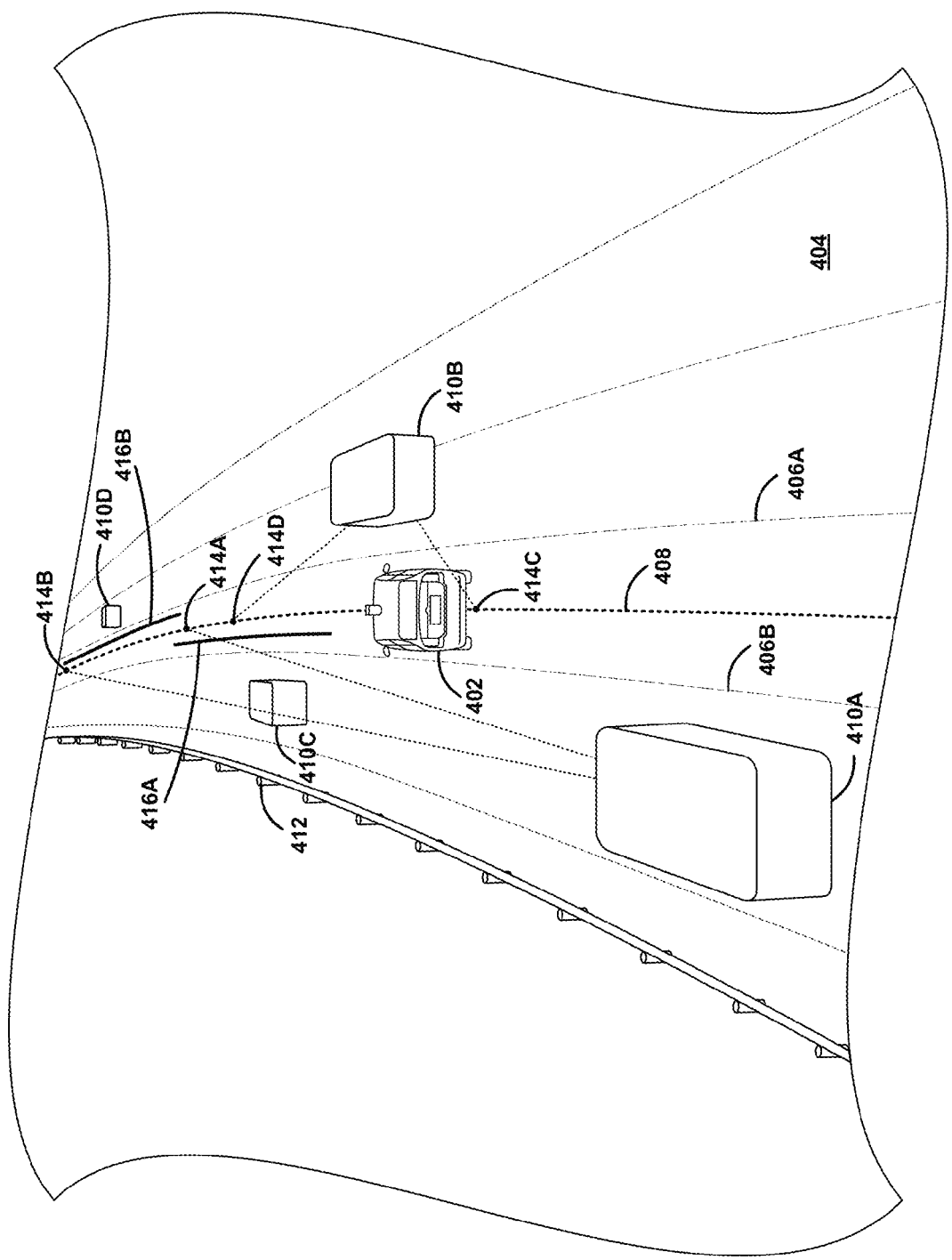
FIG. 4A illustrates lateral positioning of a vehicle on a road, in accordance with an example embodiment.

FIG. 4A illustrates lateral positioning of a vehicle 402 on a road 404, in accordance with an example embodiment. The vehicle 402 may be in a lane defined by lane boundaries 406A and 406B and may be following a trajectory 408 on the road 404. The computing device configured to control the vehicle 402 may be configured to identify objects on the road 404 such as moving objects (e.g., cars, truck, etc.) 410A, 410B, 410C, and 410D; and static objects such as guard rail 412. The computing device further may be configured to determine characteristics of the objects 410A-D and 412 such as size, location, speed, if moving, etc.

Referring back to FIG. 3, at block 304, the method 300 includes, for each object of the one or more objects, estimating, based on one or more characteristics of the vehicle and one or more respective characteristics of a respective object, a respective interval of time during which the vehicle will be laterally adjacent to the respective object. The computing device may be configured to receive, e.g., from sensor coupled to the vehicle, information indicative of characteristics of the vehicle such as speed, acceleration (or deceleration), steering angle or direction of travel, etc. Further, as described at block 302, the computing device may have determined or received information indicative of respective characteristics (e.g., size, speed, direction of travel, etc.) for respective objects identified in the vicinity of the vehicle. Based on the characteristics of the vehicle and respective characteristics of a given object, the computing device may be configured to determine an interval of time, in the near future, during which the vehicle will be laterally adjacent to the object. In determining the interval of time, the computing device may also be configured to take road geometry into account. For instance, the interval of time may be longer if the road is curving than if the road was straight, assuming that the speed of the vehicle and the speed of the object do not change.

Referring to FIG. 4A, the computing device, configured to control the vehicle 402, may have access to information indicative of characteristics of the vehicle 402, and may have determined characteristics of objects such as the objects 410A-B. Based on the characteristics of the vehicle 402 and respective characteristics of the object 410A, for example, the computing device may be configured to determine a range or portion of the road 404 at which the vehicle 402 may be laterally adjacent to the object 410A. The portion of the road 404 is illustrated in FIG. 4A as the portion between points 414A and 414B. The region or portion of the road 404 defined by or between the points 414A and 414B, may be referred to as "object effective range." The object effective range may be considered a region or portion of the road 404 at which the object 410A may have an effect of lateral positioning of the vehicle 402, for example.

Similar regions or portions or the road 404 can be estimated for all other identified objects. For example, points 414C and 414D define a portion of the road 404 at which the vehicle 402 is laterally adjacent to and will be laterally adjacent to the object 410B. As shown in FIG. 4A, the vehicle 402 has already started to be laterally adjacent to the object 410B and may continue to be laterally adjacent to the object 410B until the point 414D is crossed by the vehicle 402, for example.

The estimated interval of time may change based on any variations in speeds, for example, of the vehicle 402 or a respective object on the road. Thus, in some examples, the computing device may be configured to add or subtract a buffer amount of time to the estimated interval of time to account for or compensate for such changes.

Referring back to FIG. 3, at block 306, the method 300 includes, for each object, estimating, based on the one or more characteristics of the vehicle, one or more respective longitudinal positions of the vehicle on the road during the respective interval of time. Based on the characteristics of the vehicle such as current speed of the vehicle and predicted acceleration or deceleration, the computing device may be configured to estimate respective longitudinal positions of the vehicle on the road during the respective interval of time estimated at block 304 for a given object. For example, referring to FIG. 4A, the computing device may be configured to estimate, based on characteristics of the vehicle 402 and the trajectory 408, a continuum of future longitudinal positions of the vehicle 402 in a region defined between the point 414A and the point 4144B. In that region, the vehicle 402 will likely be laterally adjacent to the object 410A during a respective interval of time estimated as described at block 304. In an example, instead of estimating a continuum of future longitudinal positions, the computing device may be configured to estimate discretized longitudinal positions of the vehicle 402 during the respective interval of time. For instance, vehicle position can be estimated at discrete instants of time every 100 millisecond in the region at which the vehicle 402 will likely be laterally adjacent to the object 410A. Future longitudinal positions of the vehicle 402 may be estimated with respect to each identified object, during each respective interval of time.

Referring back to FIG. 3, at block 308, the method 300 includes determining, based on the one or more respective characteristics of the respective object, a respective lateral distance for the vehicle to maintain between the vehicle and the respective object during the respective interval of time at the one or more respective longitudinal positions of the vehicle. For each object identified at block 302, the computing device may be configured to estimate an optimal lateral distance to maintain between the vehicle and respective object. In one example, the computing device may be configured to utilize heuristics to mimic human-like behavior. Generally, a larger lateral distance may be maintained between the vehicle and a dynamic object than a static object because the dynamic object may change positions, speeds, and accelerations unpredictably, for example. In an example, when the vehicle is passing or being passed by a car moving at a high longitudinal speed, a larger lateral distance may be maintained between the vehicle and the car than a given lateral distance that may be maintained between the vehicle and a static object such as a guard rail. In another example, a larger lateral distance may be maintained with a large truck than with a small vehicle, because trucks may tend to wobble and maintaining the larger lateral distance may be safer than a smaller lateral distance.

In still another example, when the vehicle may be passing motorcycles, cyclists, and pedestrians, the computing device may be configured to determine a large lateral distance due to more severe consequences of a collision with such objects. In yet still another example, the computing device may be configured to identify an object that is moving laterally towards the vehicle, and thus determine a large lateral distance to maintain with the object. The large lateral distance may allow for enough time for the computing device to respond to unpredictable changes in the lateral speed of the object, for example, and control the vehicle to a safe position on the road.

In determining a given lateral distance, the computing device may be configured to take into account other factors such as road conditions (e.g., rain, snow, etc.) and type of lane the vehicle is currently in. For example, the vehicle may be in a High Occupancy Vehicle (HOV) lane, where speed differentials between vehicles in the HOV lane and vehicles that are on regular or non-HOV lanes are large. In another example, the computing device may be configured to take into account type of the object. For instance, if the object is a motorcycle, the computing device may be configured to take into account that the motorcycle may be splitting lanes. Lane splitting may refer to a two-wheeled vehicle moving between lanes of vehicles that are proceeding in the same direction. Thus, a given motorcycle that is splitting lanes may be moving between lanes at a speed greater than surrounding traffic. In this instance, the computing device may be configured to determine a large lateral distance to cause the vehicle to be biased away from the motorcycle (e.g., biased towards a shoulder of the road) and ensure safety of and avoid collision with the motorcycle. These factors are examples for illustration, and other factors can be taken into consideration for determination of a given lateral distance to be maintained between the vehicle and a given object.

In one example, the computing device may be configured to have access to a database that includes a mapping of given characteristics of a given object to a lateral distance to be maintained between the vehicle and the given object. The mapping may be based on observations of human-like driving behavior or experience-based knowledge, for example. In another example, the mapping may be based on traffic control guidelines regarding safe distance to be maintained with a give type of object. The computing device may be configured to compare respective characteristics of a respective object to given characteristics in the mapping to determine a best match or closest match and, accordingly, determine the respective lateral distance to be maintained between the vehicle and the respective object.

In addition or alternative to the database, the computing device may be configured to have access to a plurality of driving models determined for respective driving scenarios. For each such driving scenario, a driving model may be generated and an optimal lateral distance may be determined for the driving scenario. The computing device may be configured to determine that a current driving scenario is similar to a previous driving scenario for which a driving model has been generated and determine the lateral distance based on the driving model. For instance, in the motorcycle example, the computing device may be configured to determine with a high likelihood that a lane splitting event may occur given a prior model of this driving scenario. Based on the high likelihood, the computing device may be configured to bias the vehicle towards the shoulder.

In FIG. 4A, the computing device may be configured to determine respective lateral distances that the vehicle 402 may maintain with the objects 410A, 410B, 410C, 410D, the guard and all other identified objects, during respective intervals of time when the vehicle 402 may be laterally adjacent to a respective object.

In some examples, the computing device may be configured to determine, for each identified object, a repelling line that indicates that the vehicle 402 may stay on one side of the repelling line to ensure safety. For example, the computing device may be configured to determine, with respect to the object 410C, a repelling line 416A. The repelling line 416A may, in one example, define a minimum lateral distance to be maintained between the vehicle 402 and the object 410C. In this example, the computing device may be configured to cause the vehicle 402 to stay (i.e., be repelled) to the right of the repelling line 416A to maintain at least the minimum lateral distance between the vehicle 402 and the object 410C. Similarly, the computing device may be configured to determine, with respect to the object 410D, a repelling line 416B. The repelling line 416B may define a minimum lateral distance to be maintained between the vehicle 402 and the object 410D. The computing device may be configured to cause the vehicle 402 to stay to the left of the repelling line 416B to maintain at least the minimum lateral distance between the vehicle 402 and the object 410D.

Referring back to FIG. 3, at decision block 310, the method 300 determines whether the number of identified objects is reached. As described at block 302, several objects may be identified in the vicinity of the vehicle that may have an effect on lateral positioning of the vehicle in a lane on the road. Steps described at block 304, 306, and 308 are performed for each identified object. If the steps are performed for all identified objects, the method 300 includes performing the step described next with respect to block 312.

At block 312, the method 300 includes determining a modified trajectory of the vehicle based on determined respective lateral distances relating to the vehicle and the one or more objects. The computing device may include, be coupled to, or be in communication with a navigation and pathing system, such as the navigation and pathing system 148 described with respect to FIG. 1. Using the navigation and pathing system, the computing device may be configured to determine a driving path or trajectory for the vehicle. The computing device may additionally be configured to update the trajectory dynamically while the vehicle is in operation to take into account the respective lateral distances determined at block 308.

In some examples, the computing device may be configured to control the vehicle such that the vehicle may maintain the respective lateral distance with each object as determined at block 308. However, in other examples, maintaining the respective lateral distance with each object as determined at block 308 may not be possible. The objects may be close to each other on the road, and the computing device may be configured to process the respective lateral distances to determine a modified trajectory for the vehicle that is considered safest, but may not allow the respective lateral distances to be maintained as determined. The respective lateral distances may be prioritized based on the respective characteristics of each object, and the modified trajectory may be determined based on such prioritization.

As an example for illustration, the computing device may be configured to estimate that in three seconds the vehicle will be fifty meters ahead of a current position of the vehicle. At that point in time, the computing device may be configured to determine that the vehicle will be laterally adjacent to a motorcycle in a lane to the right of the lane of the vehicle and is currently behind the vehicle. The motorcycle may be moving at a high speed (e.g., above a threshold speed). Also, in this example, after the three seconds, the vehicle will be laterally adjacent to a bridge pillar to the left of the vehicle. The computing device may be configured to consider these two objects (i.e., the motorcycle and the bridge pillar), and take into account relative positions of the two objects in determining the modified trajectory. Further, the computing device may be configured to assign a respective weight indicative of priority or influence that may be given to each of the two objects in determining the modified trajectory. For example, unlike the motorcycle, the pillar will not move laterally, so a larger weight may be assigned to the motorcycle and the computing device may be configured to determine an optimal lateral position that may leave a larger gap between the vehicle and the motorcycle than between the vehicle and the pillar.

Thus, in examples, the computing device may be configured to assign, based on respective characteristics of each respective object identified at block 302, a respective weight indicative of priority given to the respective object. Based on respective weights assigned to the respective objects, the computing device may be configured to determine a modified trajectory that may be the safest trajectory given the presence of the respective objects in the vicinity of the vehicle and the respective characteristics of the respective objects.

In an example, assuming several objects that are close to each other and are moving laterally on the same lane to the right (or the left) of the lane of the vehicle, the computing device may be configured to determine respective lateral distances and may be configured to select the largest lateral distance of the respective lateral distances to maintain between the vehicle and the objects.

In another example, the vehicle may be laterally adjacent to two objects in a given portion of the road for a given period of time, where a first object of the two objects may be a bus or a truck or any large vehicle moving on one side of the vehicle, and a second object of the two objects may be a small car moving on the other side of the vehicle. In this example, the computing device may be configured to modify the trajectory of the vehicle such that the vehicle has a larger lateral distance with the first object than with the second object. Thus, the modified trajectory may be biased, relative to a center of a lane of the vehicle, towards the small vehicle.

In examples, the computing device may be configured to determine an optimized trajectory that minimizes or maximizes a given measure of performance with prescribed constraint boundaries. For example, a measure of performance that can be minimized may include deviation of the vehicle from a path that, if followed, then the vehicle will maintain a determined lateral distance with a respective object. In this example, constraints may include a smoothness constraint to prevent the vehicle from making sudden or jerky movements that may be noticeable by a passenger. For example, the smoothness constraint may be formulated by limiting changes in or rate of change of steering angle of the vehicle. Other constraints may include limits on longitudinal and lateral speed changes of the vehicle so that the vehicle complies with maximum speed limits and operates in a manner that is comfortable for passengers.

In another example, the measure of performance to be minimized may be time period between a current instant in time and a future instant of time at which the vehicle may reach a target location on the road. In this example, the constraints may include maintaining lateral distances determined for each of the identified objects on the road. In some examples, these constraints can be hard constraints that cannot be violated and other constraints can be reasonably violated. For instance, if one of the objects identified on the road is a pedestrian, a respective lateral distance determined to be maintained between the vehicle and the pedestrian may be treated as a hard constraint that cannot be violated. Thus, in determining the modified trajectory, the computing device may be configured to strictly adhere to maintaining the respective lateral distance between the vehicle and the pedestrian. However, in other examples, a given lateral distance determined to be maintained between the vehicle and a guard rail, or another small vehicle may be reasonably violated. Thus, in these examples, to determine the modified trajectory, the computing device may be configured to take the respective lateral distance into account as a soft constraint that may not be strictly adhered to, i.e., may be violated.

In addition to or alternative to determining the modified trajectory through optimization, the computing device may be configured to utilize heuristics to mimic experience-based knowledge to determine the modified trajectory. As described above, the computing device may be configured to have access to a plurality of driving models determined for respective driving scenarios. The computing device may be configured to determine similarity of a current driving scenario to a previous driving scenario for which a driving model has been generated, and determine the modified trajectory based on the driving model. For example, the computing device may be configured to determine the modified trajectory by changing parameters of the driving model to reflect specific circumstances (e.g., speed of vehicle and/or object, distance to object, characteristics of object, etc.) of the current driving scenario in the driving model.

In FIG. 4A, for example, the computing device may be configured to determine respective lateral distance for the objects 410A and 410B and modify the trajectory 408 to maintain safe lateral positioning with respect to both 410A and 410B. As an example, if the object 410A is a bus or a truck, and the object 410B is a small car, the computing device may be configured to modify the trajectory 408 such that the vehicle has a larger lateral distance with the object 410A than with the object 410B.

In an example, the two repelling lines 416A and 416B may overlap, at least partially, and a width of the vehicle 402 may be larger than a region of the road defined between the repelling lines 416A and 416B. In this example, the computing device may be configured to override at least one of the repelling lines 416A and 416B, and control the vehicle 402 such that constraint provided by the overridden line is not met. For example, the computing device may be configured to control the vehicle 402 to stay to the right of the repelling line 416A and cross (i.e., violate) the repelling line 416B or vice versa. In another example, the computing device may be configured to determine the modified trajectory for the vehicle 402 to be a centerline of a region defined between the two repelling lines 416A-B, and thus violate both constraints. In still another example, the computing device may be configured to prioritize between the two repelling lines 416A and 416B based on respective characteristics of the respective objects 410C and 410D. For example, if the object 410C is larger than the object 410D, or if the object 410C is a motorcycle while the object 410D is a small vehicle, the computing device may be configured to control the vehicle 402 to adhere to constraint set by the repelling line 416A, i.e., stay to the right of the repelling line 416A, and violate constraint set by the repelling line 416B. Thus, in a given driving scenario, a given repelling line may be a hard constraint that cannot be violated; and, in another driving scenario, the given repelling line may be a soft constraint that the computing device can reasonably cause the vehicle to violate and still determine a safe trajectory.

Figure 4B:
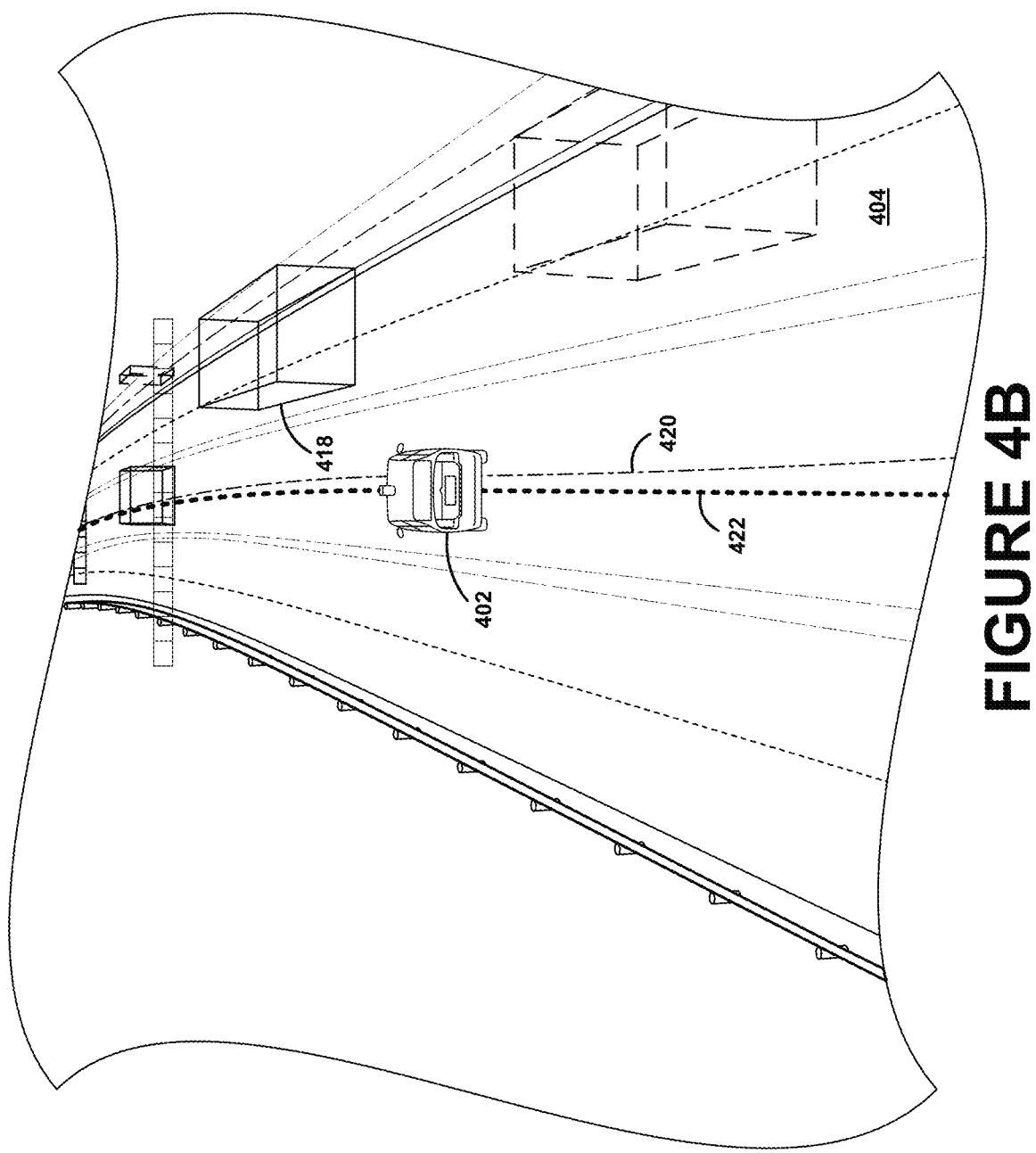
FIG. 4B illustrates lateral positioning of a vehicle based on a large object on a road, in accordance with an example embodiment.

FIG. 4B illustrates lateral positioning of the vehicle 402 based on a large object 418 on the road 404, in accordance with an example embodiment. The large object 418, which may be a truck for example, may be in a lane to the right of the lane of the vehicle 402. The vehicle 402 may be approaching the large object 418 from behind and may be following a trajectory 420. The computing device configured to control the vehicle 402 may have identified the large object 418 and determine a lateral distance to be maintained between the vehicle 402 and the large object 418. The computing device may be configured to determine a modified trajectory 422 that may be biased to the left with respect to the trajectory 408.

Figure 4C:
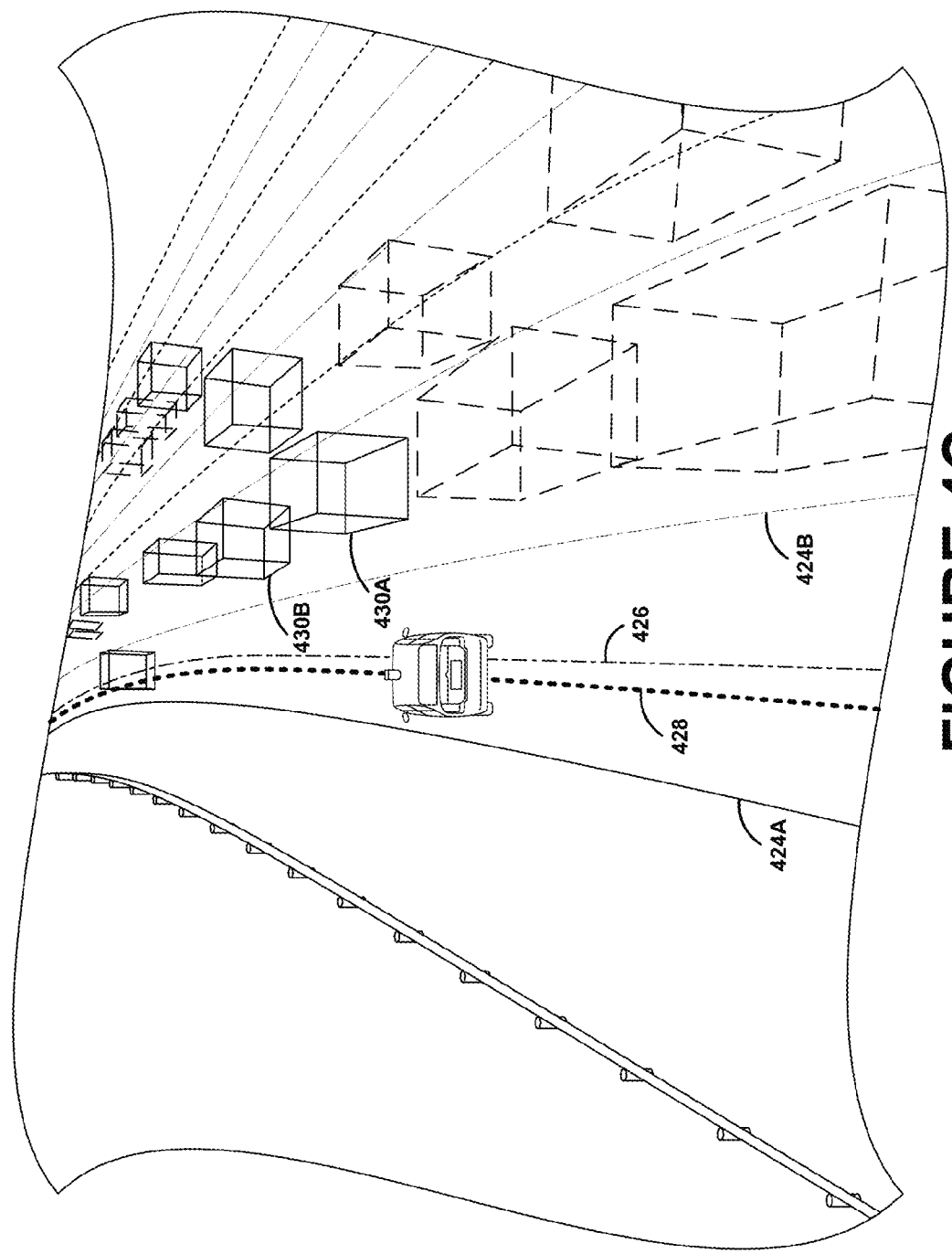
FIG. 4C illustrates lateral positioning of a vehicle in a High Occupancy Vehicle (HOV) lane, in accordance with an example embodiment.

FIG. 4C illustrates lateral positioning of the vehicle 402 in an HOV lane, in accordance with an example embodiment. The HOV lane may be defined by lane boundaries 424A and 424B. HOV lanes are characterized by large speed differentials between vehicles in the HOV lane and vehicles that are on regular or non-HOV lanes. The vehicle 402 may initially be following a trajectory 426. The computing device configured to control the vehicle 402 may determine that the vehicle 402 is travelling in an HOV lane and responsively determine a modified trajectory 428 that may be biased to the left (e.g., towards a shoulder of the road 404) with respect to the trajectory 426.

Referring back to FIG. 3, at block 314, the method 300 includes providing, using the computing device, instructions to control the vehicle based on the modified trajectory. The control system of the vehicle may comprise multiple control strategies that may be predetermined or adaptive to changes in a driving environment of the vehicle. Generally, a control strategy may comprise sets of instructions or rules associated with traffic interaction in various driving contexts. The control strategy, for example, may comprise rules that determine a speed of the vehicle, steering angle, and a lane that the vehicle may travel on while taking into account safety and traffic rules and concerns (e.g., vehicles stopped at an intersection and windows-of-opportunity in yield situation, lane tracking, speed control, distance from other vehicles on the road, passing other vehicles, and queuing in stop-and-go traffic, and avoiding areas that may result in unsafe behavior such as oncoming-traffic lanes, etc.). For instance, the computing device may be configured to determine, based on the determined modified trajectory, a control strategy comprising rules for actions that control speed, steering angle, and lane of the vehicle to safely maintain a lateral distance with the identified objects in the vicinity of the vehicle.

In an example, a given control strategy may comprise a program or computer instructions that characterize actuators controlling the vehicle (e.g., throttle, steering gear, brake, accelerator, or transmission shifter) based on the modified trajectory. The given control strategy may include action sets ranked by priority, and the action sets may include alternative actions that the vehicle may be configured to take to accomplish a task (e.g., driving from one location to another). The alternative actions may be ranked based on the modified trajectory, and respective weights assigned to a respective lateral distance determined with respect to a given object, for example.

In another example, multiple control strategies (e.g., programs) may continuously propose actions to the computing device. The computing device may be configured to decide which strategy may be selected based on a weighted set of goals (e.g., maintaining determined lateral distances, safety, speed, smoothness of the modified trajectory, etc.), for example. Based on an evaluation of the weighted set of goals, the computing device, for example, may be configured to rank the multiple control strategies and respective action sets and determine a given control strategy and a respective action set based on the ranking.

Thus, the computing device may be configured to provide instructions (e.g., instructions that may comprise an action set or rule set associated with the modified trajectory) that may be executed to control actuators of the vehicle. For instance, the computing device may be configured to provide program instructions to adjust translational velocity, or rotational velocity, or both, of the vehicle such that the vehicle may follow the modified trajectory.

In FIG. 4A, for example, the computing device may be configured to provide instructions to control the vehicle 402 such that the vehicle may maintain a safe lateral distance with the objects 410A-D and possibly adhere to constraints defined by the repelling lines 416A and 416B.

In FIG. 4B, the computing device, configured to control the vehicle 402, may be configured to provide instructions to control the vehicle 402 such that the vehicle 402 may follow the modified trajectory 422 instead of the trajectory 420. In this manner, the vehicle 402 may maintain a larger lateral distance with respect to the large object 418 than a respective lateral distance that would have separated the vehicle 402 from the large object 418 if the vehicle 402 followed the trajectory 420.

In FIG. 4C, the computing device, configured to control the vehicle 402, may be configured to provide instructions to control the vehicle 402 such that the vehicle 402 may follow the modified trajectory 428 instead of the trajectory 426. In this manner, the vehicle 402 may maintain larger lateral distances with respect to objects 430A and 430B, for example, in lanes to the right of the HOV lane than respective lateral distances that would have separated the vehicle 402 from the objects 430A and 430B if the vehicle 402 followed the trajectory 426.

These control actions and driving situations are for illustration only. Other example situations are possible as well.

In some embodiments, the disclosed methods may be implemented as computer program instructions encoded on a computer-readable storage media in a machine-readable format, or on other non-transitory media or articles of manufacture. FIG. 5 is a schematic illustrating a conceptual partial view of an example computer program product 500 that includes a computer program for executing a computer process on a computing device, arranged according to at least some embodiments presented herein. In one embodiment, the example computer program product 500 is provided using a signal bearing medium 501. The signal bearing medium 501 may include one or more program instructions 502 that, when executed by one or more processors (e.g., processor 113 in the computing device 111) may provide functionality or portions of the functionality described above with respect to FIGS. 1-4. Thus, for example, referring to the embodiments shown in FIG. 3, one or more features of blocks 302-312 may be undertaken by one or more instructions associated with the signal bearing medium 501. In addition, the program instructions 502 in FIG. 5 describe example instructions as well.

In some examples, the signal bearing medium 501 may encompass a computer-readable medium 503, such as, but not limited to, a hard disk drive, a Compact Disc (CD), a Digital Video Disk (DVD), a digital tape, memory, etc. In some implementations, the signal bearing medium 501 may encompass a computer recordable medium 504, such as, but not limited to, memory, read/write (R/W) CDs, R/W DVDs, etc. In some implementations, the signal bearing medium 501 may encompass a communications medium 505, such as, but not limited to, a digital and/or an analog communication medium (e.g., a fiber optic cable, a waveguide, a wired communications link, a wireless communication link, etc.). Thus, for example, the signal bearing medium 501 may be conveyed by a wireless form of the communications medium 505 (e.g., a wireless communications medium conforming to the IEEE 802.11 standard or other transmission protocol).

The one or more programming instructions 502 may be, for example, computer executable and/or logic implemented instructions. In some examples, a computing device such as the computing device described with respect to FIGS. 1-4 may be configured to provide various operations, functions, or actions in response to the programming instructions 502 conveyed to the computing device by one or more of the computer readable medium 503, the computer recordable medium 504, and/or the communications medium 505. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    classifying, by a computing device, a first vehicle on or proximate to a road of travel of a second vehicle controlled by the computing device as being a particular vehicle type from among at least a first vehicle type, a second vehicle type, and a third vehicle type, wherein the first vehicle type is indicative of motorcycles, the second vehicle type is indicative of cars, and the third vehicle type is indicative of trucks;
    estimating, based on characteristics of the second vehicle and respective characteristics of the first vehicle, one or more positions at which the second vehicle will be adjacent to the first vehicle;
    determining, by the computing device based, at least in part, on the particular vehicle type of the first vehicle, a lateral distance to be maintained between the second vehicle and the first vehicle at the one or more positions; and
    providing, by the computing device, instructions to control the second vehicle based on the lateral distance.

2. The method of claim 1, wherein, based on the particular vehicle type indicating that the first vehicle is a motorcycle, the lateral distance is larger than a respective lateral distance that would be maintained if the particular vehicle type indicates that the first vehicle is a car.

3. The method of claim 1, wherein, based on the particular vehicle type indicating that the first vehicle is a truck, the lateral distance is larger than a respective lateral distance that would be maintained if the particular vehicle type indicates that the first vehicle is a car.

4. The method of claim 1, further comprising:
    determining, based on the particular vehicle type, that the first vehicle is a motorcycle being driven in an area between two adjacent lanes on the road including a lane of travel of the second vehicle; and
    in response, increasing the lateral distance to be maintained between the second vehicle and the first vehicle while the second vehicle is adjacent to the first vehicle.

5. The method of claim 1, wherein the lateral distance to be maintained between the first vehicle and the second vehicle is a first lateral distance, the method further comprising:
    identifying a third vehicle of a respective vehicle type;
    determining that the second vehicle will be adjacent to both the first vehicle and the third vehicle at the one or more positions on the road; and
    determining a second lateral distance to be maintained between the second vehicle and the third vehicle at the one or more positions on the road, wherein determining the first lateral distance and the second lateral distance is based on a comparison between the particular vehicle type of the first vehicle and the respective vehicle type of the third vehicle.

6. The method of claim 5, wherein the first lateral distance is larger than the second lateral distance based on the particular vehicle type of the first vehicle indicating that the first vehicle is a motorcycle and the respective vehicle type of the third vehicle indicating that the third vehicle is a car or a truck.

7. The method of claim 5, wherein the first lateral distance is larger than the second lateral distance based on the particular vehicle type of the first vehicle indicating that the first vehicle is a truck and the respective vehicle type of the third vehicle indicating that the third vehicle is a car.

8. The method of claim 1, further comprising:
    determining a repelling line between the first vehicle and the second vehicle, wherein the repelling line is a virtual longitudinal line in a space between the first vehicle and the second vehicle at the one or more positions, wherein a given lateral distance between the repelling line and the first vehicle is the determined lateral distance to be maintained between first vehicle and the second vehicle while the second vehicle is adjacent to the first vehicle, and wherein providing the instructions to control the second vehicle comprises preventing the second vehicle from crossing the repelling line.

9. The method of claim 8, wherein the repelling line is a first repelling line, the method further comprising:
    identifying a third vehicle of a respective vehicle type;
    determining a respective lateral distance to be maintained between the second vehicle and the third vehicle based on the respective vehicle type of the third vehicle; and determining a second repelling line between the second vehicle and the third vehicle, wherein a given lateral distance between the second repelling line and the third vehicle is the respective lateral distance to be maintained between second vehicle and the third vehicle, and wherein providing the instructions to control the second vehicle comprises causing the second vehicle to remain between the first repelling line and the second repelling line.

10. The method of claim 8, wherein the repelling line is a first repelling line, the method further comprising:
identifying a third vehicle of a respective vehicle type;
determining a respective lateral distance to be maintained between the second vehicle and the third vehicle based on the respective vehicle type of the third vehicle;
determining a second repelling line between the second vehicle and the third vehicle, wherein a given lateral distance between the second repelling line and the third vehicle is the respective lateral distance to be maintained between second vehicle and the third vehicle; and
determining that a given lateral distance between the first repelling line and the second repelling line is smaller than a width of the second vehicle, wherein providing the instructions to control the second vehicle comprises causing the second vehicle to violate the first repelling line or the second repelling line based on a comparison between the particular vehicle type of the first vehicle and the respective vehicle type of the third vehicle.

11. The method of claim 1, further comprising:
determining that the first vehicle is moving laterally toward the second vehicle controlled by the computing device; and
in response, increasing the lateral distance to be maintained between the second vehicle and the first vehicle while the second vehicle is adjacent to the first vehicle so as to accommodate motion of the first vehicle toward the second vehicle.

12. The method of claim 1, further comprising:
determining an interval of time during which the second vehicle will be adjacent to the first vehicle, wherein estimating the one or more positions at which the second vehicle will be adjacent to the first vehicle comprises estimating the one or more positions during the interval of time.

13. The method of claim 12, further comprising:
adding a buffer amount of time to the interval of time so as to accommodate changes in speed and direction of travel of the first vehicle.

14. The method of claim 1, wherein the respective characteristics of the first vehicle include a speed and a direction of motion of the first vehicle, and wherein the characteristics of the second vehicle include a respective speed and a respective direction of motion of the second vehicle.

15. A non-transitory computer readable medium having stored thereon executable instructions that, upon execution by a computing device, cause the computing device to perform functions comprising:
classifying a first vehicle on or proximate to a road of travel of a second vehicle controlled by the computing device as being a particular vehicle type from among at least a first vehicle type, a second vehicle type, and a third vehicle type, wherein the first vehicle type is indicative of motorcycles, the second vehicle type is indicative of cars, and the third vehicle type is indicative of trucks;
estimating, based on characteristics of the second vehicle and respective characteristics of the first vehicle, one or more positions at which the second vehicle will be adjacent to the first vehicle;
determining, based, at least in part, on the particular vehicle type of the first vehicle, a lateral distance to be maintained between the second vehicle and the first vehicle at the one or more positions; and
providing instructions to control the second vehicle based on the lateral distance.

16. The non-transitory computer readable medium of claim 15, wherein, based on the particular vehicle type indicating that the first vehicle is a motorcycle, the lateral distance is larger than a respective lateral distance that would be maintained if the particular vehicle type indicates that the first vehicle is a car.

17. The non-transitory computer readable medium of claim 15, wherein, based on the particular vehicle type indicating that the first vehicle is a truck, the lateral distance is larger than a respective lateral distance that would be maintained if the particular vehicle type indicates that the first vehicle is a car.

18. A control system comprising:
at least one processor; and
a memory having stored thereon executable instructions that, upon execution by the at least one processor, cause the control system to perform functions comprising:
classifying a first vehicle on or proximate to a road of travel of a second vehicle controlled by the control system as being a particular vehicle type from among at least a first vehicle type, a second vehicle type, and a third vehicle type, wherein the first vehicle type is indicative of motorcycles, the second vehicle type is indicative of cars, and the third vehicle type is indicative of trucks;
estimating, based on characteristics of the second vehicle and respective characteristics of the first vehicle, one or more positions at which the second vehicle will be adjacent to the first vehicle;
determining, based, at least in part, on the particular vehicle type of the first vehicle, a lateral distance to be maintained between the second vehicle and the first vehicle at the one or more positions; and
providing instructions to control the second vehicle based on the lateral distance.

19. The control system of claim 18, wherein the functions further comprise:
determining, based on the particular vehicle type, that the first vehicle is a motorcycle being driven in an area between two adjacent lanes on the road including a lane of travel of the second vehicle; and
in response, increasing the lateral distance to be maintained between the second vehicle and the first vehicle while the second vehicle is adjacent to the first vehicle.

20. The control system of claim 18, wherein the lateral distance to be maintained between the first vehicle and the second vehicle is a first lateral distance, and wherein the functions further comprise:
identifying a third vehicle of a respective vehicle type;
determining that the second vehicle will be adjacent to both the first vehicle and the third vehicle at the one or more positions on the road; and
determining a second lateral distance to be maintained between the second vehicle and the third vehicle at the one or more positions on the road, wherein determining the first lateral distance and the second lateral distance is based on a comparison between the particular vehicle type of the first vehicle and the respective vehicle type of the third vehicle.

\* \* \* \* \*